US012566391B2

(12) United States Patent
Fujita

(10) Patent No.: US 12,566,391 B2
(45) Date of Patent: Mar. 3, 2026

(54) IMAGE FORMING APPARATUS

(71) Applicant: CANON KABUSHIKI KAISHA, Tokyo (JP)

(72) Inventor: Hideki Fujita, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/793,036

(22) Filed: Aug. 2, 2024

(65) Prior Publication Data

US 2025/0044734 A1 Feb. 6, 2025

(30) Foreign Application Priority Data

Aug. 4, 2023 (JP) ................................ 2023-127863
May 14, 2024 (JP) ................................ 2024-078954

(51) Int. Cl.

| | |
|---|---|
| ***G03G 21/10*** | (2006.01) |
| ***G03G 15/01*** | (2006.01) |
| ***G03G 15/095*** | (2006.01) |
| ***G03G 15/16*** | (2006.01) |

(52) U.S. Cl.

CPC ....... *G03G 15/095* (2013.01); *G03G 15/0131* (2013.01); *G03G 15/0189* (2013.01); *G03G 15/1605* (2013.01); *G03G 21/10* (2013.01)

(58) Field of Classification Search

CPC ....... G03G 21/0047; G03G 2221/0005; G03G 15/0921; G03G 15/095; G03G 15/161; G03G 15/1605; G03G 15/0189; G03G 15/0131

See application file for complete search history.

(56) References Cited

U.S. PATENT DOCUMENTS

| | | | | |
|---|---|---|---|---|
| 5,715,503 | A * | 2/1998 | Leone | G03G 15/095 399/129 |
| 6,347,212 | B1 | 2/2002 | Kosugi et al. | |
| 10,656,564 | B2 * | 5/2020 | Takayanagi | G03G 15/161 |
| 2022/0128934 | A1 * | 4/2022 | Yamagishi | G03G 21/0011 |

FOREIGN PATENT DOCUMENTS

| | | | |
|---|---|---|---|
| JP | 1-134484 | A | 5/1989 |
| JP | 2001-337572 | A | 12/2001 |
| JP | 2005-309183 | A | 11/2005 |
| JP | 2007-316145 | A | 12/2007 |
| JP | 2009-157327 | A | 7/2009 |

OTHER PUBLICATIONS

English translation of Japanese Laid-open Patent Application No. 2005-309183.

* cited by examiner

*Primary Examiner* — Jessica L Eley
(74) *Attorney, Agent, or Firm* — Venable LLP

(57) ABSTRACT

An image forming apparatus includes a rotatable image bearing member, a developing device including a developing container and a developer carrying member, a rotatable intermediary transfer member, and a carrier collecting device including a rotatable sleeve and a magnet. With respect to a rotational direction of the intermediary transfer member, the collecting device is disposed downstream of a first transfer position where a toner image borne on the image bearing member is transferred onto the intermediary transfer member and upstream of a second transfer position where the toner image borne on the intermediary transfer member is transferred onto a recording material.

8 Claims, 12 Drawing Sheets

IMAGE FORMING APPARATUS

FIELD OF THE INVENTION AND RELATED ART

The present invention relates to an image forming apparatus such as a copying machine, a printer, a facsimile machine, or a multi-function machine having a plurality of functions of these machines.

As the image forming apparatus, a constitution in which a toner image is formed with a two-component developer containing non-magnetic toner and a magnetic carrier has been known conventionally. In this constitution, in general, in a developing step, although an electrostatic latent image on a photosensitive drum is developed as the toner image with the toner, the carrier is also deposited on the photosensitive drum in a certain ratio in some cases (carrier deposition). When the carrier deposition occurs, the deposited carrier has an influence on an output image, and therefore, for example, in Japanese Laid-Open Patent Application No. Hei 1-134484, a constitution provided with a carrier collecting device for collecting the carrier deposited on the photosensitive drum is disclosed.

Here, at a periphery of the photosensitive drum, various devices, such as a charging device, a developing device, a transfer device, and a cleaning device, used in an image forming step are provided. For this reason, when the carrier collecting device is intended to be further disposed at the periphery of the photosensitive drum, the image forming apparatus is upsized. On the other hand, in order to suppress upsizing of the image forming apparatus, in the case where the carrier collecting device is downsized and is disposed at the periphery of the photosensitive drum, there is a possibility that a carrier collecting performance of the carrier collecting device becomes insufficient.

SUMMARY OF THE INVENTION

A principal object of the present invention is to enhance carrier collecting ability while suppressing upsizing of an image forming apparatus.

According to an aspect of the present invention, there is provided an image forming apparatus comprising: a rotatable image bearing member on which an electrostatic latent image is formed; a developing device including a developing container configured to accommodate a developer containing non-magnetic toner and a magnetic carrier, and a developer carrying member configured to carry the developer for developing the electrostatic latent image, formed on the image bearing member, into a toner image; a rotatable intermediary transfer member onto which the toner image borne on the image bearing member is transferred; and a carrier collecting device including a rotatable sleeve provided opposed to the intermediary transfer member and a magnet non-rotationally provided inside the sleeve and configured to collect the carrier on the intermediary transfer member, wherein with respect to a rotational direction of the intermediary transfer member, the collecting device is disposed downstream of a first transfer position where the toner image borne on the image bearing member is transferred onto the intermediary transfer member and upstream of a second transfer position where the toner image borne on the intermediary transfer member is transferred onto a recording material.

Further features of the present invention will become apparent from the following description of exemplary embodiments with reference to the attached drawings.

DESCRIPTION OF THE EMBODIMENTS

First Embodiment

A first embodiment will be described using FIGS. 1 to 8. First, a general structure of an image forming apparatus according to this embodiment will be described using FIGS. 1 to 3.

[Image Forming Apparatus]

Figure 1:
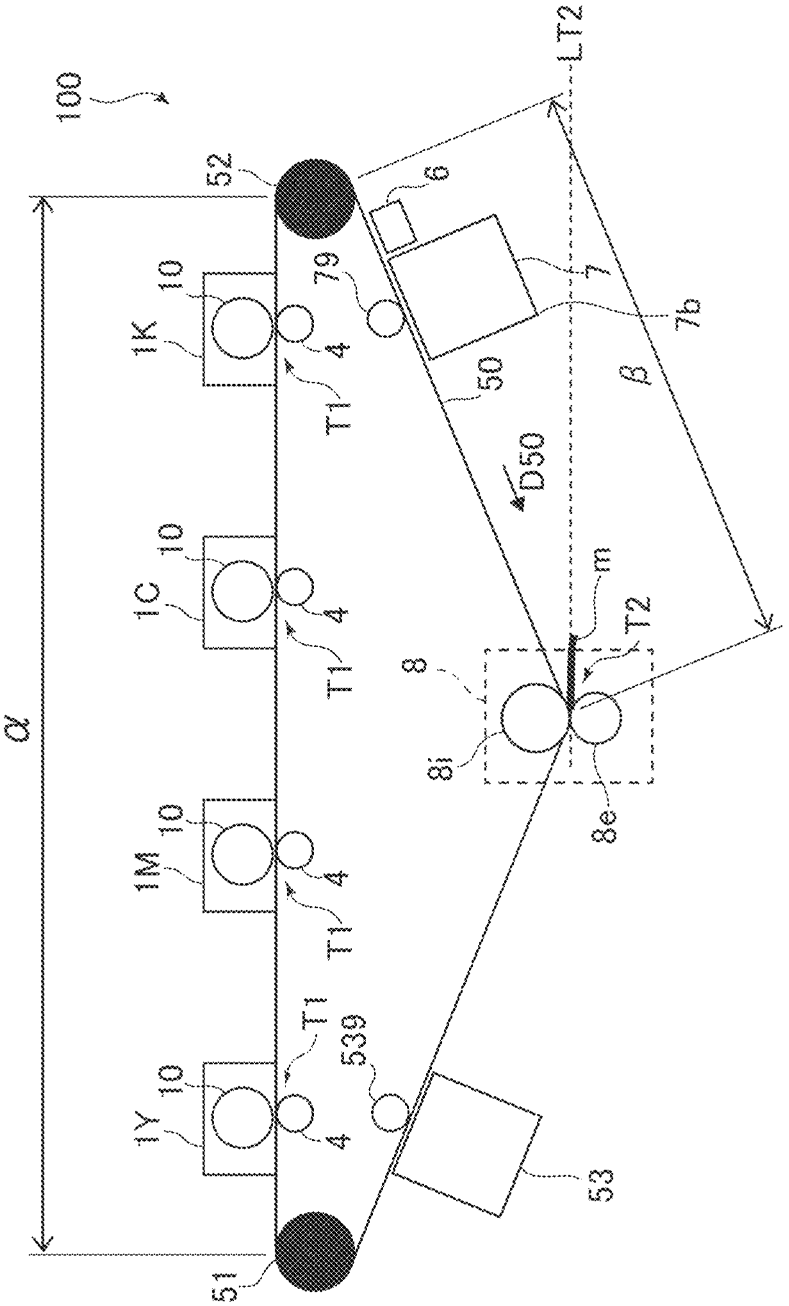
FIG. 1 is a schematic structural sectional view of an image forming apparatus according to a first embodiment.

An image forming apparatus 100 of this embodiment is a full-color laser beam printer of an electrophotographic type. The image forming apparatus 100 includes, as shown in FIG. 1, four image forming units 1Y, 1M, 1C, and 1K, a rotatable intermediary transfer member 50, a belt cleaning device 53, a carrier discharging device 6, a carrier collecting device 7, and the like. The image forming apparatus 100 forms a toner image on a recording material depending on an image signal from an original reading apparatus connected to an image forming apparatus main assembly or a host device such as a personal computer communicatably connected to the image forming apparatus main assembly. As the recording material, it is possible to cite sheet materials such as a sheet, a plastic film, and a cloth. Further, the four image forming units 1Y, 1M, 1C, and 1K form toner images of yellow, magenta, cyan, and black, respectively.

Incidentally, the four image forming units 1Y, 1M, 1C, and 1K have substantially the same constitution except that developing colors thereof are different from each other. Accordingly, as a representative, the image forming unit 1Y is described, and other image forming units will be omitted from description.

Figure 2:
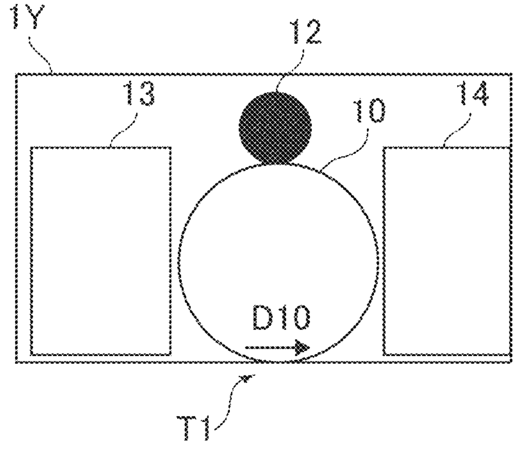
FIG. 2 is a schematic structure sectional view of an image forming unit in the first embodiment.

The image forming unit 1Y is provided with, as shown in FIG. 2, a cylindrical photosensitive member as an image bearing member capable of bearing an electrostatic latent image on a surface, i.e., a photosensitive drum 10. The photosensitive drum 10 is rotationally driven by transmitting thereto a driving force from an unshown driving portion provided in the image forming apparatus main assembly. In the image forming unit 1Y, at periphery of the photosensitive drum 10, a charging roller 12 as a charging device, a developing device 13, a primary transfer roller 4 (FIG. 1), and a drum cleaning device 14 are provided. Above the photosensitive drum 10 in FIG. 2, an unshown exposure device (a laser scanner in this embodiment) is provided.

The photosensitive drum 10 is, for example, 30 mm in outer diameter and includes an organic photosensitive layer. Further, the photosensitive drum 10 is rotated in an arrow D10 direction at an outer peripheral speed of 330 mm/s at the maximum during image formation. The charging roller 12 electrically charges a surface of the photosensitive drum 10 uniformly. The exposure device forms the electrostatic latent image by exposing the surface of the photosensitive drum 10, with light, charged by the charging roller 12. The developing device 13 includes a developing container accommodating a two-component developer containing non-magnetic toner and a magnetic carrier, and a developing sleeve as a rotatable developer carrying member carrying the two-component developer accommodated in the developing container, and the electrostatic latent image formed on the surface of the photosensitive drum 10 is developed into a toner image with the two-component developer carried by the developing sleeve. The primary transfer roller 4 primarily transfers the toner image, onto the intermediary transfer member 50, formed on the surface of the photosensitive drum 10. The drum cleaning device 14 removes transfer residual toner remaining on the photosensitive drum 10 after the primary transfer.

The intermediary transfer member 50 contacts the photosensitive drums 10 of the image forming units 1Y, 1M, 1C, and 1K, and forms primary transfer portions T1 where toner images are primarily transferred from the photosensitive drums 10, respectively. Further, with respect to a rotational direction of the intermediary transfer member 50, on a side downstream of the primary transfer portions T1, a secondary transfer portion T2 where the toner images are secondarily transferred from the intermediary transfer member 50 onto the recording material is formed. At the secondary transfer portion T2, a secondary transfer roller 8*e* as a secondary transfer member is provided so as to contact an outer peripheral surface of the intermediary transfer member 50. Further, between the intermediary transfer member 50 and the secondary transfer roller 8*e*, a nip in which the recording material is nipped and conveyed, is formed.

The intermediary transfer member 50 may preferably have a volume resistivity of $10^{6}$-$10^{12}$ Ω·cm. Further, as the intermediary transfer member 50, it is possible to use a belt which is formed of an elastic material such as urethane-based resin, fluorine-based resin, nylon-based resin, polyimide resin, a silicone rubber, or a hydrin rubber and in which an electric resistance thereof is adjusted by dispersing carbon or electroconductive powder into the elastic material, or the like belt.

As shown in FIG. 1, the intermediary transfer member 50 is stretched and supported by a first roller 51, a second roller 52, and a third roller 8*i* which are a plurality of stretching rollers. A magnitude of tension exerted on the first to third rollers 51, 52, and 8*i* varies depending on the material of the intermediary transfer member 50, but may preferably be a value not causing rupture and permanent deformation of the intermediary transfer member 50. In this embodiment, by using the intermediary transfer member 50 of a polyimide resin type, setting is made so as not to cause the rupture and the permanent deformation.

Figure 3:
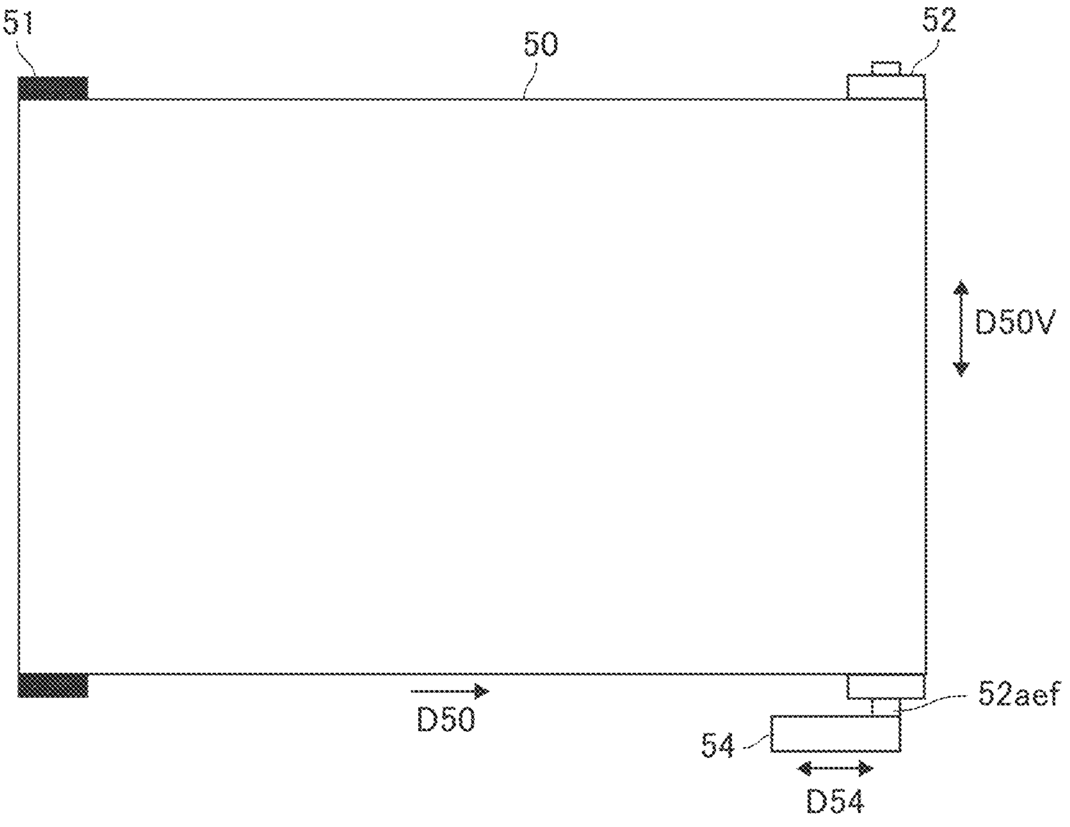
FIG. 3 is a schematic structural plan view of an intermediary transfer member in the first embodiment.

The first roller 51 includes, for example, an elastic layer made of EPDM (ethylene-propylene-dien-methylene (rubber)) at another periphery thereof, and an outer diameter thereof is 30 mm. Further, the first roller 51 is driven by an unshown motor and rotationally drives the intermediary transfer member 50 in an arrow D50 direction. That is, the first roller 51 is a driving roller for driving the intermediary transfer member 50. The second roller 52 is made of solid non-magnetic metal and is 30 mm in outer diameter. As shown in FIG. 3, the second roller 52 controls a position of the intermediary transfer member 50, with respect to a direction (widthwise direction, an arrow D50V direction) perpendicular to a movement direction of the intermediary transfer member 50, to an appropriate position by changing a position of a supporting member 54 supporting one end 52*aef* of a rotational shaft thereof in an arrow D54 direction. That is, the second roller 52 is a steering roller for controlling a position (shift position) of the intermediary transfer member 50 with respect to the widthwise direction of the intermediary transfer member 50.

The first roller 51, the second roller 52, and the third roller 8*i* are disposed in a named order in the rotational direction of the intermediary transfer member 50, and the toner images are transferred from the photosensitive drums 10 onto the intermediary transfer member 50 in a first stretching region α of the intermediary transfer member 50 stretched by the first roller 51 and the second roller 52. That is, in the first stretching region α, the photosensitive drums 10 of the image forming units 1Y, 1M, 1C, and 1K are disposed on an outer peripheral surface side and the primary transfer rollers 4 of the image forming units 1Y, 1M, 1C, and 1K are disposed on the outer peripheral surface side, and form the primary transfer portions T1 of the image forming units 1Y, 1M, 1C, and 1K, respectively. In each of the primary transfer portions T1, the intermediary transfer member 50 is nipped between the primary transfer roller 4 and the photosensitive drum 10. As the primary transfer roller 4, a roller in which an elastic layer of a foam urethane is formed on an outer peripheral surface of a rotation shaft metal may preferably be used. To the primary transfer roller 4, a voltage of 100 to 1000 V of a polarity opposite to a normal charge polarity of the toner is applied.

The third roller 8*i* is disposed in a position opposing the secondary transfer roller 8*e* through the intermediary transfer member 50 therebetween. That is, the third roller 8*i* is an inner secondary transfer roller for stretching the intermediary transfer member 50. In this embodiment, a secondary transfer device 8 is constituted by the third roller 8*i* and the secondary transfer roller 8*e*.

As a material of the third roller 8*i*, solid or foam EPDM, NBR (nitrile rubber), or the like is preferred, and as a material of the secondary transfer roller 8*e*, NBR or the like is preferred. To the secondary transfer roller 8*e*, a voltage of 1.0 to 6.0 kV of the polarity opposite to the normal charge polarity of the toner is applied.

[Operation of Entire Image Forming Apparatus]

In the following, an operation of the entirety of the image forming apparatus 100 will be described while appropriately adding description on a constitution of the image forming apparatus 100. On the basis of image information received from a host computer (not shown) or the like, in each of the image forming units 1Y, 1M, 1C and 1K, the photosensitive drum 10 is rotationally driven in a counterclockwise direction of FIG. 2 by drive from a driving portion (not shown), and the surface of the photosensitive drum 10 is electrically charged uniformly by the charging roller 12. Then, the exposure device (not shown) exposes the surface of the photosensitive drum 10 with laser light modulated on the basis of the image information, so that an electrostatic latent image is formed. Intensity and a spot diameter of the laser light are properly set by a resolution and a desired image density of the image forming apparatus 100. The electrostatic latent image on the photosensitive drum 10 is formed by a laser light irradiation portion (light portion, potential VL) and a laser light non-irradiation portion (dark portion, potential VD).

The electrostatic latent image reaches an opposing portion to the developing device 13 by rotation of the photosensitive drum 10, and the toner charged to the same polarity (negative polarity in this embodiment) as the normal charge polarity is deposited on the light portion of the electrostatic latent image, so that the electrostatic latent image is developed as the toner image. In the case where a full-color image is formed, in the image forming units 1Y to 1K corresponding to the respective colors, the respective color toner images are similarly formed. These color toner images are successively primarily transferred onto the intermediary transfer member 50 in the primary transfer portions T1, respectively, and are superimposed on the intermediary transfer member 50.

In each of the primary transfer portions T1, the toner image is primarily transferred by an electric field formed in the primary transfer portion T1 by a voltage of the opposite polarity to the normal charge polarity of the toner applied to the primary transfer roller 4 opposing the inner peripheral surface of the intermediary transfer member 50. In a stage in which the intermediary transfer member 50 passes through the primary transfer portions T1 with the photosensitive drums 10 for the respective colors, a full-color image is carried on the intermediary transfer member 50, so that a primary transfer step is completed. On the other hand, the surface of the photosensitive drum 10 after the polarity of the toner image is ended is cleaned by the associated drum cleaning device 14, and thereafter, is prepared for a subsequent image forming step.

Next, one recording material m is fed from a feeding portion (not shown), and is conveyed in the secondary transfer portion T2 direction. At this time, to the secondary transfer roller 8*e*, a voltage of the opposite polarity to the normal charge polarity of the toner is applied, whereby the four color toner images are collectively secondarily transferred from the intermediary transfer member 50 onto the recording material m. The recording material m which passes through the secondary transfer portion T2 and which carries an unfixed toner image reaches a fixing device (not shown) and is heated and pressed, so that the unfixed toner image is fixed as a permanent image. On the other hand, the surface of the intermediary transfer member 50 after completion of the transfer of the toner image on the recording material m is cleaned by the belt cleaning device 53.

The belt cleaning device 53 scrapes off secondary transfer residual toner deposited on the surface of the intermediary transfer member 50 by bringing a cleaning blade, for example, formed of a urethane rubber or the like, into contact with the intermediary transfer member 50 surface (outer peripheral surface). The scraped-off secondary transfer residual toner is collected in a residual toner container (not shown). The secondary transfer residual toner refers to toner remaining on the surface of the intermediary transfer member 50 without being secondarily transferred onto the recording material m during the secondary transfer. Further, the inner peripheral surface of the intermediary transfer member 50 opposing the belt cleaning device 53 is supported by a supporting roller 539. By this, a cleaning blade can be stably contacted to the outer peripheral surface of the intermediary transfer member 50, so that the secondary transfer residual toner can be removed reliably. Incidentally, the belt cleaning device 53 may be disposed on the outer peripheral surface of the intermediary transfer member 50 stretched by the first roller 51. In this case, the first roller 51 functions as a supporting roller.

[Carrier Collecting Device]

Next, the carrier collecting device 7 for collecting the carrier deposited on the intermediary transfer member 50 will be described using FIGS. 1 and 4.

Figure 4:
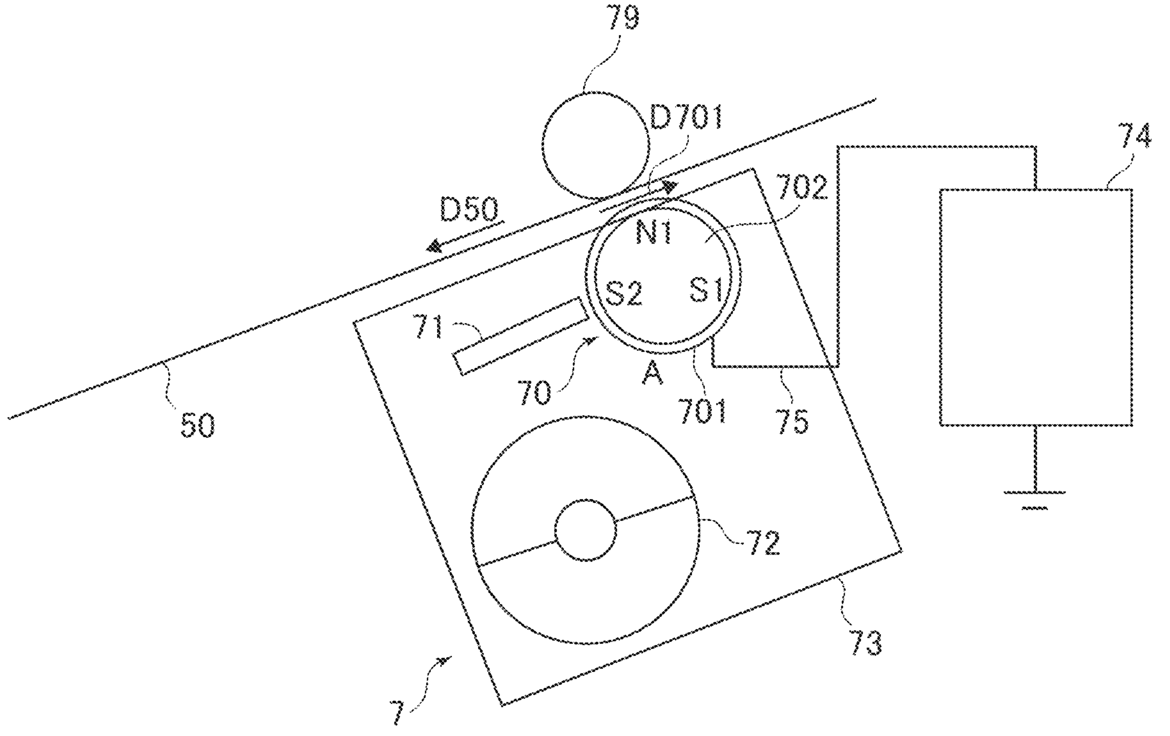
FIG. 4 is a schematic structural sectional view of a periphery of a carrier collecting device in the first embodiment.

FIG. 4 is an enlarged view of the carrier collecting device 7. In the constitution disclosed in the above-described Japanese Laid-Open Patent Application No. Hei 1-134484, the carrier collecting device 7 is disposed at a periphery of the photosensitive drum, but in this embodiment, the carrier collecting device 7 is not disposed at the periphery of the photosensitive drum 10, and is disposed at a periphery of the intermediary transfer member 50.

With respect to the rotational direction (arrow D50 direction) of the intermediary transfer member 50, the carrier collecting device 7 is disposed so as to oppose the outer peripheral surface of the intermediary transfer member 50 in a non-contact manner on a side downstream of the primary transfer portion (a primary transfer position) T1 and upstream of the secondary transfer portion (a secondary transfer position) T2. In the case of this embodiment, the image forming apparatus 100 includes the four image forming units 1Y to 1K, and therefore, of these image forming units, the carrier collecting device 7 is disposed on a side downstream of the primary transfer portion (the primary transfer position) T1 of the most downstream image forming unit 1K with respect to the rotational direction of the intermediary transfer member 50.

Particularly, in this embodiment, as shown in FIG. 1, the carrier collecting device 7 is disposed in a position opposing a second stretching region β of the intermediary transfer member 50 stretched by the second roller 52 and the third roller 8*i*. The intermediary transfer member 50 is stretched by the first roller 51, the second roller 52, and the third roller 8*i* as described above, and a cross-sectional shape thereof is a substantially triangular shape. For this reason, outside the second stretching region β of the intermediary transfer member 50, there is sufficient space. Accordingly, in this embodiment, the carrier collecting device 7 is disposed in this space. Specifically, as shown in FIG. 1, the carrier collecting device 7 is disposed so that a lowermost end 7*b* of the carrier collecting device 7 is above a horizontal line LT2 passing through a position (secondary transfer portion T2) where the secondary transfer roller 8*e* and the third roller 8*i* are closest to each other. By this, even when the carrier collecting device 7 is disposed in the image forming apparatus 100, it is possible to suppress upsizing of the image forming apparatus 100.

The carrier collecting device 7 collects the carrier deposited on the outer peripheral surface of the intermediary transfer member 50. Particularly, in this embodiment, the carrier collecting device 7 collects the carrier by a magnetic force. Specifically, as shown in FIG. 4, the carrier collecting device 7 includes a carrier collecting roller 70, a carrier collecting blade 71, a carrier conveying screw 72, a carrier collecting container 73, and the like. The carrier collecting container 73 accommodates the carrier collecting roller 70, the carrier collecting blade 71, and the carrier conveying screw 72, and also accommodates a collected carrier. The carrier collecting roller 70 includes a rotatable collecting sleeve 701, and a magnet roller 702 as a magnetic field generating portion, and the like.

The collecting sleeve 701 is disposed so as to oppose an outer peripheral surface of the intermediary transfer member 50 with a predetermined gap. The collecting sleeve 701 is, for example, a cylindrical member made of non-magnet metal of 24.5 mm in outer diameter, and has a thickness of 0.7 mm. The collecting sleeve 701 is formed of a material with no thermal deformation, excellent in anti-wearing property, and easy in processing property. A rotational direction of the collecting sleeve 701 is an arrow D701 direction (i.e., a counterdirection) in which a surface movement direction thereof in a position opposing the intermediary transfer member 50 is opposite to a movement direction of an outer peripheral surface of the intermediary transfer member 50. Further, a gap in a closest position between the outer peripheral surface of the collecting sleeve 701 and the outer peripheral surface of the intermediary transfer member 50 is, for example, 100 μm or more and 150 μm or less.

In order to maintain a distance between the collecting sleeve 701 and the intermediary transfer member 50 constant, inside the intermediary transfer member 50 in a position opposing the collecting sleeve 701, a supporting roller 79 is provided so as to contact an inner peripheral surface of the intermediary transfer member 50. The supporting roller 79 supports the intermediary transfer member 50 from an inside and is, for example, a cylindrical member made of non-magnetic metal of 20 mm in outer diameter. The supporting roller 79 does not include a driving source and is pressed against the intermediary transfer member 50 by a pressing spring (not shown) in order to follow motion of the intermediary transfer member 50.

The magnet roller 702 is disposed non-rotationally inside the collecting sleeve 701, and causes the carrier to be adsorbed on the surface of the collecting sleeve 701 by a magnet force. In this embodiment, the magnet roller 702 has a plurality (three in this embodiment) of magnetic poles at a periphery of a rotation shaft made of non-magnetic metal, and an outer peripheral surface thereof is formed in a cylindrical shape having an outer diameter of 17 mm. As the magnetic poles, it is possible to use ferrite magnet such as barium ferrite or strontium ferrite, and a rubber ferrite magnet in which the ferrite magnet is dispersed in a rubber.

The magnet roller 702 includes a magnetic pole N1 as a first magnetic pole, a magnetic pole S1 as a second magnetic pole, and a magnetic pole S2 as a third magnetic pole. The magnetic pole N1 is disposed in a position opposing the intermediary transfer member through the collecting sleeve 701. The magnetic pole N1 is a magnetic pole for attracting the carrier deposited on the outer peripheral surface of the intermediary transfer member 50, and for this reason, the magnetic pole N1 is disposed in the neighborhood of a closest position between the intermediary transfer member 50 and the collecting sleeve 701. Magnetic density of the magnetic pole N1 in a direction perpendicular to a surface of the collecting sleeve 701 may preferably be 150 mT or more.

The magnetic pole S1 is disposed downstream of the magnetic pole N1 with respect to the rotational direction of the collecting sleeve 701 and is different in polarity from the magnetic pole N1. Further, the magnetic pole S2 is disposed downstream of and adjacent to the magnetic pole S1 with respect to the rotational direction of the collecting sleeve 701, and is the same polarity as the magnetic pole S1. Such magnetic poles S1 and S2 are a repelling magnetic pole pair provided on an opposite side from the magnetic pole N1 with respect to a rotational axis of the collecting sleeve 701. At a position A of a center portion between the magnetic poles S1 and S2, on a surface of the collecting sleeve 701, a force applied to the carrier by a repelling magnet field formed by the magnetic poles S1 and S2 becomes substantially 0. In the position A, the carrier drops from the collecting sleeve 701 into the carrier collecting container 73, so that the once collected carrier is prevented from being conveyed again toward the surface of the intermediary transfer member 50.

The carrier collecting blade 71 as a blade is disposed opposed to the collecting sleeve 701 with a gap on a side downstream of a position where the collecting sleeve 701 opposes the intermediary transfer member 50, with respect to the rotational direction of the collecting sleeve 701. This gap is, for example, 100 μm. Further, the carrier collecting blade 71 removes the carrier deposited on the collecting sleeve 701. In this embodiment, the carrier collecting blade 71 is disposed in a position opposing the magnetic pole S2 through the collecting sleeve 701. For this reason, the carrier erected by a magnet field of the magnetic pole S2 can be scraped off by the carrier collecting blade 71. By this, the carrier remaining on the collecting sleeve 701 without being dropped from the collecting sleeve 701 by the repelling magnetic field generated by the magnetic poles S1 and S2 can be scraped off into the carrier collecting container 73 by the carrier collecting blade 71.

The carrier conveying screw 72 as a carrier conveying member is disposed below the collecting sleeve 701 in the carrier collecting container 73. The carrier conveying screw 72 includes a rotation shaft made of non-magnet metal and a blade formed of resin helically at a periphery of the rotation shaft, and is 33 mm in outer diameter, for example. The carrier conveying screw 72 is rotated, and thus conveys the carrier dropped from the collecting sleeve 701, in a rotational axis direction. In this embodiment, the rotational axis direction of the carrier conveying screw 72 and the rotational axis direction of the collecting sleeve 701 are substantially parallel to each other.

Thus, in this embodiment, the carrier deposited on the surface of the intermediary transfer member 50 is attracted to the collecting sleeve 701 by the magnetic pole N1 and then is conveyed toward an inside of the carrier collecting container 73 with rotation of the collecting sleeve 701. Then, by the action of the magnetic poles S1 and S2 which repel each other, at the position A which is a substantially center portion between the magnetic poles S1 and S2, the magnetic force acting on the carrier becomes substantially 0, and therefore, the carrier conveyed to the position A is dropped by gravitation. Further, the carrier remaining on the collecting sleeve 701 without being dropped at the position A is scraped off by the carrier collecting blade 71. The carrier dropped inside the carrier collecting container 73 is conveyed by the carrier conveying screw 72 in a direction along the rotation shaft of the carrier conveying screw 72, and then is stored in a carrier storing container (not shown) provided on the front side of the image forming apparatus main assembly. Incidentally, the front side is a side where, for example, an operator such as a user operates the image forming apparatus 100, and is, for example, a side where an operating portion such as an operating panel for operating the image forming apparatus 100 is provided. Further, the rear side is a side opposite from the front side and is a rear (surface) side of the image forming apparatus 100.

Thus, by conveying the carrier, dropped from the collecting sleeve 701, by the carrier conveying screw 72, it is possible to prevent that the carrier is excessively stored below the carrier conveying screw 72. The carrier conveyed by the carrier conveying screw 72 is stored in the carrier storing container as described above, and for example, during maintenance, the carrier storing container is exchanged by the user or a service person. Incidentally, in the above-described explanation, in order to drop the carrier from the collecting sleeve 701, the magnetic poles S1 and S2 which repel each other, and the carrier collecting blade 71 were used, but a constitution in which the carrier is dropped by the repelling magnetic field may be omitted. However, when both the constitutions are used, the carrier can be efficiently dropped from the collecting sleeve 701.

Further, in this embodiment, a power source 74 as a first voltage applying portion capable of applying a voltage of the same polarity as a charge polarity of the toner to the collecting sleeve 701 is provided. For this reason, the power source 74 is connected to the collecting sleeve 701 through a cable 75. By applying the voltage of the same polarity as the charge polarity of the toner to the collecting sleeve 701 by the power source 74, it is possible to suppress that the toner carried on the intermediary transfer member 50 is collected by the collecting sleeve 701. The voltage applied from the power source 74 to the collecting sleeve 701 is, for example, 1000 V or more and 1500 V or less in terms of an absolute value.

Thus, in this embodiment, the carrier on the surface of the intermediary transfer member 50 is collected by the magnetic field of the magnet roller 702 incorporated in the collecting sleeve 701, and in addition, the voltage of the same polarity as the charge polarity of the toner is applied to the collecting sleeve 701 by the power source 74. As a result, it becomes possible to suppress collection of the toner of a part of the toner image, carried on the intermediary transfer member 50, by the collecting sleeve 701 while collecting the carrier from the intermediary transfer member 50. For this reason, with respect to the rotational direction of the intermediary transfer member 50, even when the carrier collecting device 7 is provided downstream of the primary transfer portion T1 and upstream of the secondary transfer portion T2, it is possible to suppress the influence on the toner image transferred onto the intermediary transfer member 50 in the primary transfer portion T1.

[Carrier Discharging Device]

Further, in this embodiment, as shown in FIG. 1, prior to carrier collection, the carrier discharging device 6 for lowering a carrier charging amount is disposed in a position adjacent to and upstream of the carrier collecting device 7 with respect to the rotational direction of the intermediary transfer member 50. That is, the carrier discharging device 6 as a second voltage applying portion is disposed on a side downstream of the primary transfer portion T1 and upstream of the carrier collecting device 7 with respect to the rotational direction of the intermediary transfer member 50. Further, the carrier discharging device 6 is capable of applying a voltage, of an opposite polarity to a charge polarity of the carrier, to the carrier deposited on the outer charged polarity.

Figure 5:
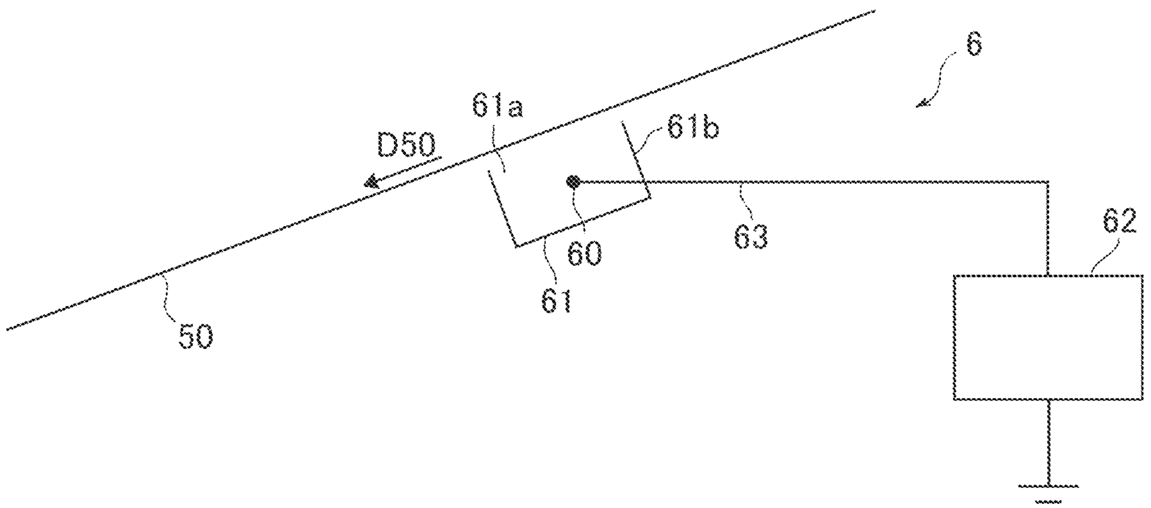
FIG. 5 is a schematic structural sectional view of a periphery of a carrier discharging device in the first embodiment.
Figure 6:
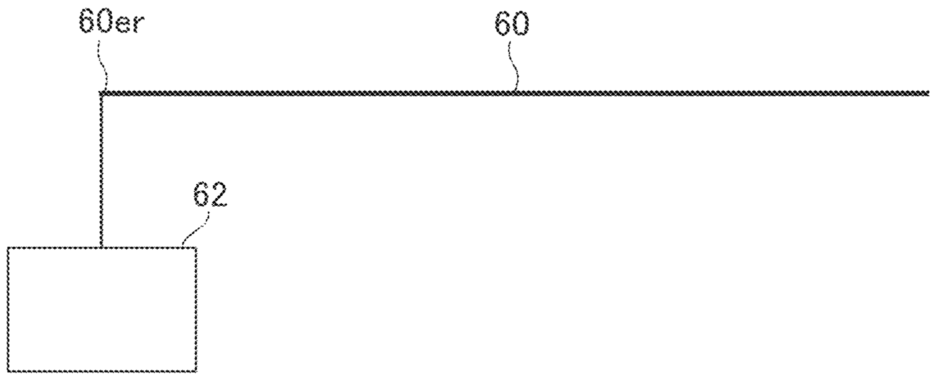
FIG. 6 is a schematic view showing a carrier discharging wire in the first embodiment.

Such a carrier discharging device 6 includes, as shown in FIG. 5, a corona charger 61 and a power source 62. The corona charger 61 includes a casing 61*b* made of non-magnetic metal provided with an opening 61*a* open toward the intermediary transfer member 50, and includes a discharging wire 60 disposed inside the casing 61*b*. The discharging wire 60 is disposed along a widthwise direction crossing the rotational direction of the intermediary transfer member 50, and as shown in FIG. 6, to a rear-side end portion 60*er* of the discharging wire 60, the power source 62 is connected by way of an electrode (not shown) disposed on the image forming apparatus main assembly side and a cable 63. Further, from the power source 62 to the discharging wire 60, a discharging bias which is a voltage of the opposite polarity to the charge polarity of the carrier is applied.

As a result, by the corona charger 61, the charge amount of the carrier deposited on the intermediary transfer member 50 is lowered, so that an electrostatic depositing force of the carrier onto the intermediary transfer member 50 can be lowered. By this, in the carrier collecting device 7 positioned on a side downstream of the carrier discharging device 6 with respect to the rotational direction of the intermediary transfer member 50, the collection of the intermediary transfer member 50 can be made more easily. Incidentally, in this embodiment, the discharging bias applied from the power source 62 is 500 V or more and 1000 V or less in terms of an absolute value.

According to such a constitution of this embodiment, the carrier collection can be sufficiently performed without suppressing upsizing of the image forming apparatus. That is, in this embodiment, as in the above-described first embodiment, the carrier collecting device 7 is provided at the periphery of the intermediary transfer member 50 without providing the carrier collecting device at a periphery of the photosensitive drum. For this reason, the carrier deposited from the developing device 13 onto the photosensitive drum 10 is deposited on the intermediary transfer member 50 in the primary transfer portion T1. The carrier deposited on the outer peripheral surface of the intermediary transfer member 50 is collected, before being transferred onto the recording material m, by the carrier collecting device 7 disposed downstream of the primary transfer portion T1 and upstream of the secondary transfer portion T2.

By this, it is possible to suppress that the carrier enters between the intermediary transfer member 50 and the belt cleaning device 53 and then an outer periphery of the intermediary transfer member is damaged and the toner image formed on the recording material m is disturbed, and by extension to improve durability of the intermediary transfer member 50 and to obtain a stable output image.

The carrier collecting device 7 in this embodiment is sufficiently small compared with a peripheral length (750 mm in this embodiment) of the intermediary transfer member 50, and therefore, even when the carrier collecting device 7 is disposed on an outer peripheral surface side of the intermediary transfer member 50, the influence on the upsizing of the image forming apparatus 100 is small. Further, in the case where the carrier collecting device is intended to be disposed at the periphery of the photosensitive drum while suppressing the upsizing of the image forming apparatus 100, downsizing of the carrier collecting device is required. However, in the case where the carrier collecting device is downsized, there is a possibility that a sufficient carrier collecting performance cannot be obtained. On the other hand, in this embodiment, the carrier collecting device 7 is disposed on the outer peripheral surface side of the intermediary transfer member 50, and therefore, even when the carrier collecting device 7 is downsized, the influence on the upsizing of the image forming apparatus 100 is small. As a result, in a constitution in which the carrier collecting performance can be sufficiently obtained, upsizing of the image forming apparatus 100 can be suppressed.

Experiment

Here, an experiment conducted from confirming an effect of the above-described first embodiment will be described.

The experiment was conducted in the following manner for constitutions of an embodiment 1 which is the constitution of the above-described first embodiment, an embodiment 2 which is a constitution of a second embodiment, an embodiment 3 which is a constitution of a third embodiment, an embodiment 4 which is a constitution of a fourth embodiment, an embodiment 5 which is a constitution of a fifth embodiment, a comparison example 1, and a comparison example 2, which are described later. That is, in the experiment, in each of the constitutions, solid images of black (K) were formed on A4-sized sheets, and 1000 sheets thereof were outputted. In this case, an "image defect occurrence rate due to carrier deposition" and an "image defect occurrence rate due to scattering toner deposition" were checked by eye observation.

The "image defect occurrence rate due to carrier deposition (%)" is a proportion of the number of pages of output images with image defect due to carrier deposition to a total number of pages of all the output images. The "image defect occurrence rate due to scattering toner deposition (%)" is a proportion of the number of pages of output images with image defect due to scattering toner deposition to a total number of pages of all the output images. Incidentally, a charge polarity of most of scattering toner is an opposite polarity to a normal charge polarity of the toner and is the same polarity as the charge polarity of the carrier. For this reason, the scattering toner is collected together with the carrier in the carrier collecting device. Accordingly, when the carrier collecting performance of the carrier collecting device is high, a scattering toner collecting performance also becomes high, so that the image defect occurrence rate due to the scattering toner deposition also lowers.

A result of this experiment is shown in a table 1 below. Incidentally, a "total cost of carrier collecting device and carrier discharging device" is a relative value in the case where the total cost in the embodiment 1 is taken as 100. Further, in the table 1, a lifetime of the intermediary transfer member and a size of the image forming apparatus 100 in each of the constitutions are also shown in combination. The lifetime of the intermediary transfer member is common to all the constitutions. Further, the size of the image forming apparatus is a size of the image forming apparatus in a left-right direction in the case where the image forming apparatus is viewed from the front side.

TABLE 1

| | | EMB. 1 | EMB. 2 | EMB. 3 | EMB. 4 | EMB. 5 | COMP. EX. 1 | COMP. EX. 2 |
|---|---|---|---|---|---|---|---|---|
| CONSTITUTION | POSITION*1 | | | BELT*2 | | | DRUM*3 | |
| | NUMBER*4 | | | 1 | | | 4 | |
| | RELATION*5 | | INDEPENDENT | | IR*6 | | INDEPENDENT | |
| | ROLLER*7 | | | | | YES | | |
| | FORMATION*8 | YES | NO | | | | YES | |
| | DEVICE*9 | YES | | NO | YES | YES | NO | NO |
| PERFORMANCE | LIFETIME*10 | | | | | 1500 | | |
| | SIZE*11 | | | | 900 | | | 1100 |
| | RATE(CARRIER)*12 | 0.03 | 0.03 | 0.05 | 0.01 | 0.02 | 0.27 | 0.03 |
| | RATE(TONER)*13 | 0.03 | 0.08 | 0.03 | 0.03 | 0.03 | 0.08 | 0.07 |
| | COST*14 | 100 | 92.5 | 50 | 115 | 241 | 165 | 232 |

*1"POSITION" shows the position of the carrier collecting device.
*2"BELT" shows the neighborhood of the outer periphery of the intermediary transfer belt.
*3"DRUM" shows the neighborhood of the photosensitive drum.
*4"NUMBER" shows the number of carrier collecting devices.
*5"RELATION" shows a relationship between the carrier collecting device and the steering roller.
*6"IR" shows "interrelated".
*7"ROLLER" shows the carrier collecting roller for generating the magnetic field.
*8"FORMATION" shows formation of toner collection suppression electric field.
*9"DEVICE" shows the carrier discharging device.
*10"LIFETIME" shows the lifetime of the intermediary transfer belt (unit: 10000 sheets).
*11"SIZE" shows the size of the image forming apparatus (unit: mm).
*12"RATIO(CARRIER)" shows the image defect occurrence rate due to the carrier deposition (unit: %).
*13"RATIO(TONER)" shows the image defect occurrence rate due to the scattering toner deposition (unit: %).
*14"COST" shows a total cost of the carrier collecting device and the carrier discharging device.

Comparison Example 1

Figure 7:
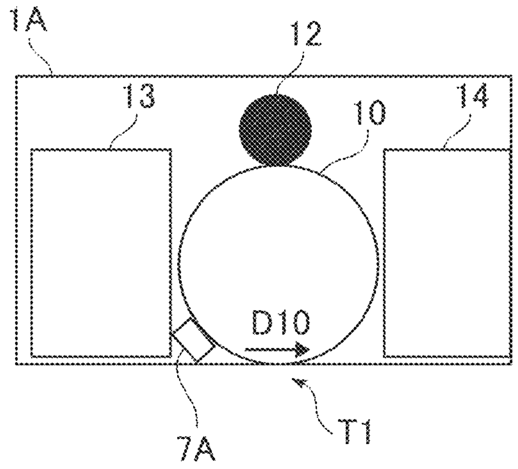
FIG. 7 is a schematic structural sectional view of an image forming unit in a comparison example 1.

Here, the comparison example 1 will be described using FIG. 7. FIG. 7 shows only an image forming unit 1A, and the comparison example 1 is the same as the embodiment 1 except for a position of the carrier collecting devices and the number of the carrier collecting devices. In the comparison example 1, a carrier collecting device 7A is disposed in the neighborhood of the outer periphery of the photosensitive drum 10 on a side downstream of the developing device 13 and upstream of the primary transfer portion T1 with respect to the rotational direction (arrow D10 direction) of the photosensitive drum 10.

A basic structure of the carrier collecting device 7A is the same as the constitution of the carrier collecting device 7 in the first embodiment, but in the comparison example 1, the carrier collecting device 7A is downsized in conformity to a narrow space. Specifically, an outer diameter of the collecting sleeve is 10 mm (24.5 mm in the embodiment 1). For this reason, a magnetic force of the magnet roller provided inside the collecting sleeve is also low, so that carrier collecting ability is low. Further, the image forming apparatus includes the four image forming units, and therefore, in the comparison example 1, four image forming units 7A are needed, so that a device cost increases and in addition, the image forming apparatus is also upsized.

Comparison Example 2

Figure 8:
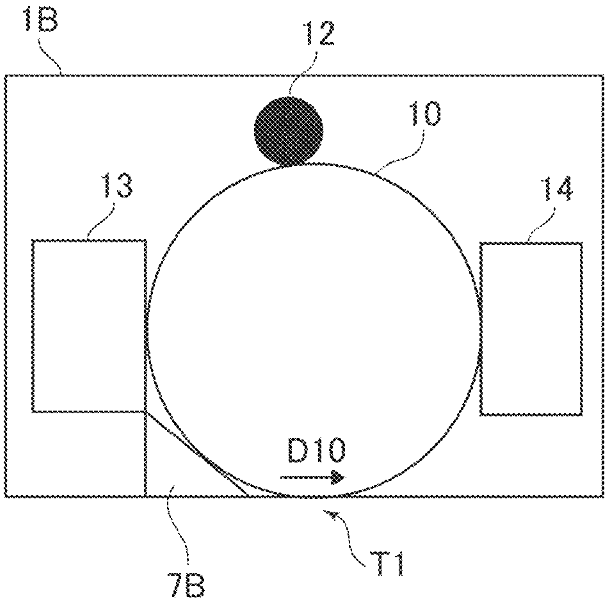
FIG. 8 is a schematic structural sectional view of an image forming unit in a comparison example 2.

Next, the comparison example 2 will be described using FIG. 8. FIG. 8 shows only an image forming unit 1B, and the comparison example 2 is the same as the embodiment 1 except for a position of the carrier collecting device and the number of the carrier collecting device. In the comparison example 2, similarly as in the comparison example 1, a carrier collecting device 7B is disposed in the neighborhood of the outer periphery of the photosensitive drum 10 on a side downstream of the developing device 13 and upstream of the primary transfer portion T1 with respect to the rotational direction (arrow D10 direction) of the photosensitive drum 10. However, in the comparison example 2, the carrier collecting device 7B preferentially ensures a sufficient performance and is not subjected to excessive downsizing as in the comparison example 1. That is, the carrier collecting device 7B is upsized compared with the carrier collecting device 7A in the comparison example 1.

In the embodiment 1, in order to dispose the carrier collecting device 7B large in size at the periphery of the photosensitive drum 10, an outer diameter of the photosensitive drum 10 is made 84 mm, so that a space at the periphery of the photosensitive drum 10 is enlarged. By this, the carrier collecting device 7B having the sufficient performance can be disposed, while a cost of the photosensitive drum 10 increases and the image forming apparatus is further upsized. Further, similarly as in the comparison example 1, four carrier collecting devices 7 are needed, so that the device cost increases, and in addition, the image forming apparatus is also upsized.

In the table 1, when the embodiment 1 and the comparison example 1 are compared with each other, it is understood that as regards the "image defect occurrence rate due to scattering toner deposition (%)" and the "image defect occurrence rate due to carrier deposition (%)", better results are obtained in the embodiment 1 than in the comparison example 1. Further, it is understood that also as regards the cost, the cost can be made lower in the embodiment 1 than in the comparison example 1.

Further, when the embodiment 1 and the comparison example 2 are compared with each other, it is understood that the "image defect occurrence rate due to carrier deposition (%)" is not changed, but as regards the "image defect occurrence rate due to scattering toner deposition (%)", a better result is obtained in the embodiment 1 than in the comparison example 2. Further, in the comparison example 2, a size of the image forming apparatus is larger than a size of the image forming apparatus in the embodiment 1, and in addition, it is understood that as regards the cost, the cost becomes remarkably higher than the cost in the embodiment 1. From the above, it is understood that by disposing the carrier collecting device 7 on the outer periphery side of the intermediary transfer member 50 as in the embodiment 1, compared with the comparison examples 1 and 2 in which the carrier collecting devices 7A and 7B are disposed at the periphery of the photosensitive drums 10, the carrier collecting performance can be made equivalent to or more than those in the comparison examples 1 and 2, and in addition, it is possible to realize reductions in size of the image forming apparatus and device cost.

Second Embodiment

Figure 9:
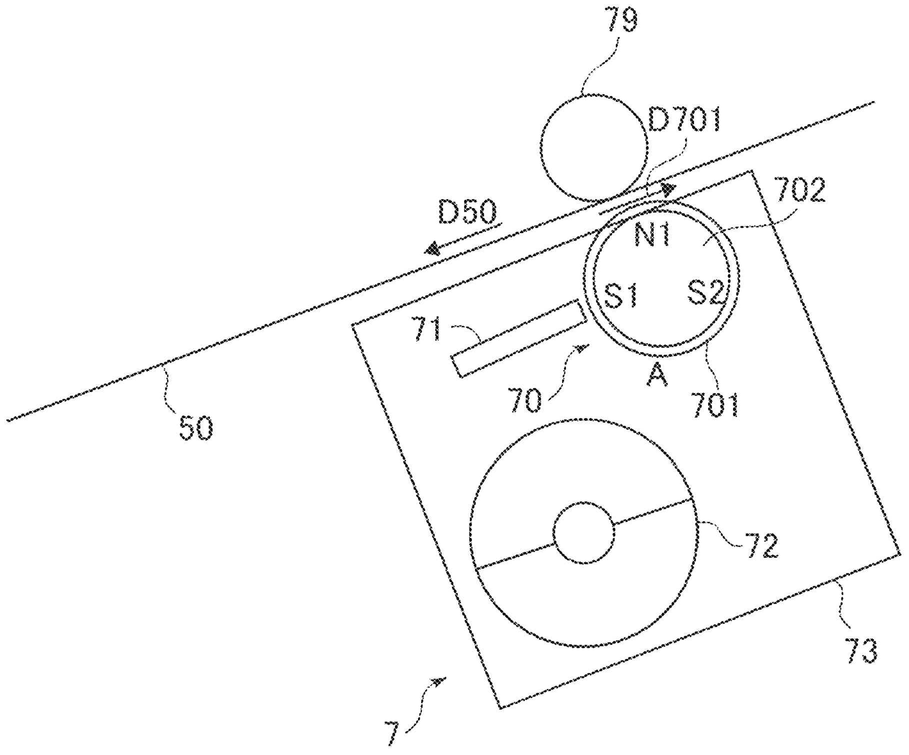
FIG. 9 is a schematic structural sectional view of a periphery of a carrier collecting device in a second embodiment.

A second embodiment will be described using FIG. 9. In this embodiment, difference from the first embodiment, the power source 74 as the first voltage applying portion capable of applying the voltage of the same polarity as the toner charge polarity to the collecting sleeve 701 is not provided. Other constitutions and actions are the same as those in the above-described embodiment 1.

In the case of this embodiment, different from the first embodiment, the electric field capable of suppressing the collection of the toner in the carrier collecting device 7 cannot be formed. However, a power source, a cable, and an electrode which are needed for the constitution in which the toner collection is suppressed are not provided, and therefore, the device cost can be reduced compared with the first embodiment.

In the case of this embodiment, as shown in a result of the embodiment 2 in the above-described table 1, compared with the embodiment 1, although the image defect occurrence rate due to scattering toner operation becomes high, the image defect occurrence rate due to carrier deposition was the same as that in the embodiment 1. For this reason, the image defect hardly becomes practically problematic, and the device cost is also inexpensive.

Third Embodiment

Figure 10:
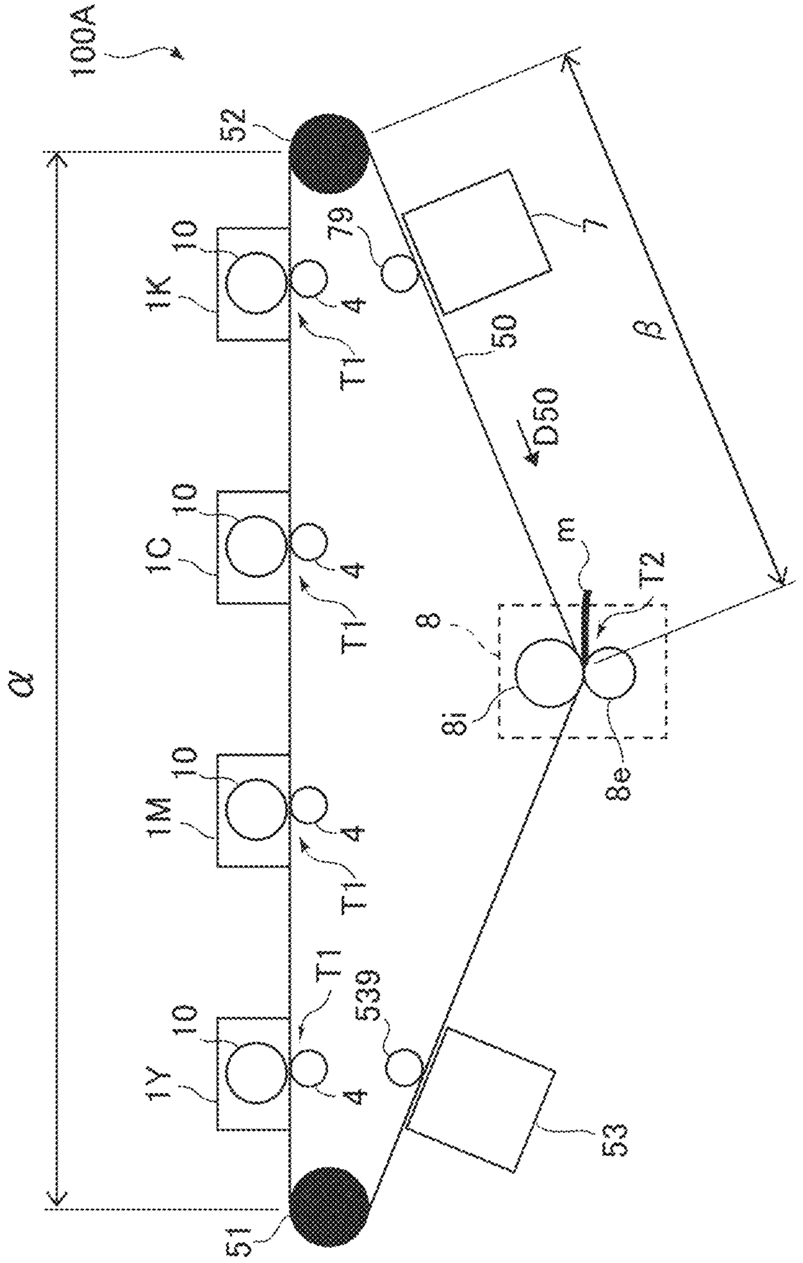
FIG. 10 is a schematic structural sectional view of an image forming apparatus according to a third embodiment.

A third embodiment will be described using FIG. 10. In this embodiment, difference from the first embodiment, the carrier discharging device 6 is not provided on a side upstream of the carrier collecting device 7 with respect to the rotational direction of the intermediary transfer member 50. Other constitutions and actions are the same as those in the above-described embodiment 1.

In the case of an image forming apparatus 100A in this embodiment, different from the first embodiment, a constitution in which prior to the carrier collection, the carrier charge amount is lowered is not employed. However, compared with the first embodiment, the carrier discharging device 6 shown in FIGS. 5 and 6 can be omitted and therefore, the device cost can be reduced compared with the first embodiment.

In the case of this embodiment, as shown in a result of the embodiment 2 in the above-described table 1, compared with the embodiment 1, carrier collecting efficiency lowers, and therefore, although the image defect occurrence rate due to carrier operation increases, the image defect occurrence rate due to scattering toner deposition was the same as that in the embodiment 1. For this reason, the image defect hardly becomes practically problematic, and the device cost is also inexpensive.

Fourth Embodiment

Figure 11:
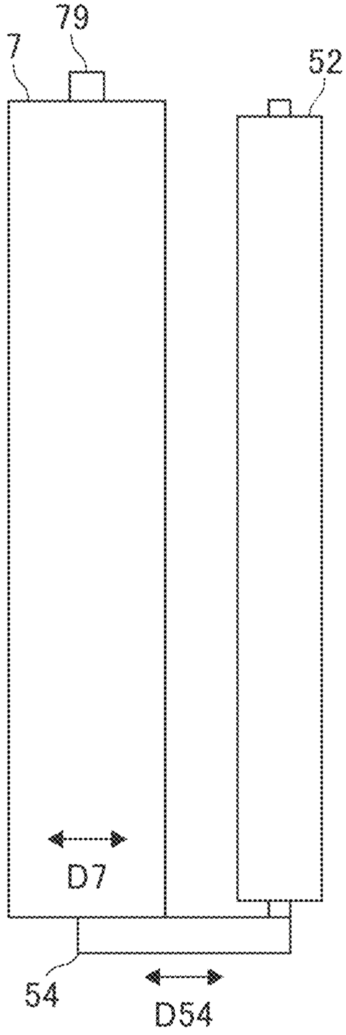
FIG. 11 is a schematic structural plan view of a periphery of a carrier collecting device in a fourth embodiment.

A fourth embodiment will be described using FIG. 11. FIG. 11 is a plan view showing a schematic structure of a periphery of a carrier collecting device 7 in this embodiment (the intermediary transfer member 50 is not shown).

In this embodiment, similarly as in the first embodiment, the second roller 52 functions as a steering roller for controlling a position (shift position) of the intermediary transfer member 50 with respect to the widthwise direction of the intermediary transfer member 50. On the other hand, in this embodiment, different from the embodiment 1, in interrelation with the control of the position (shift position) of the intermediary transfer member 50 with respect to the widthwise direction by the second roller 52, it is possible to optimize a position of the carrier collecting device 7 relative to the intermediary transfer member 50. Other constitutions and actions are the same as those in the above-described first embodiment.

Specifically, as shown in FIG. 11, the carrier collecting device 7 is connected to the supporting member 54 movable in a D54 direction for controlling the position (shift position) of the intermediary transfer member 50 with respect to the widthwise direction of the intermediary transfer member 50, and therefore, is also interrelated with the second roller 52. Further, the carrier collecting device 7 moves in a D7 direction about a rear-side supporting point 79 thereof. By this, even in the case where the control of the position (shift position) of the intermediary transfer member 50 with respect to the widthwise direction of the intermediary transfer member 50 is carried out, the carrier collecting device 7 is capable of maintaining an optimum relative position thereof to the intermediary transfer member 50.

In such a case of this embodiment, as shown in the embodiment 4 of the above-described table 1, compared with the embodiment 1, the image defect occurrence rate due to carrier deposition becomes low. On the other hand, a relationship between the carrier collecting device 7 and the steering roller is "independent", whereas in the embodiment 4, the relationship between the carrier collecting device 7 and the steering roller is "interrelated", so that the device cost is increased correspondingly to a mechanism for making the position of the carrier collecting device 7 variable. Incidentally, also for embodiments 2, 3, and 5 and comparison examples 1 and 2, the relationship between the carrier collecting device 7 and the steering roller is made "independent".

Fifth Embodiment

Figure 12:
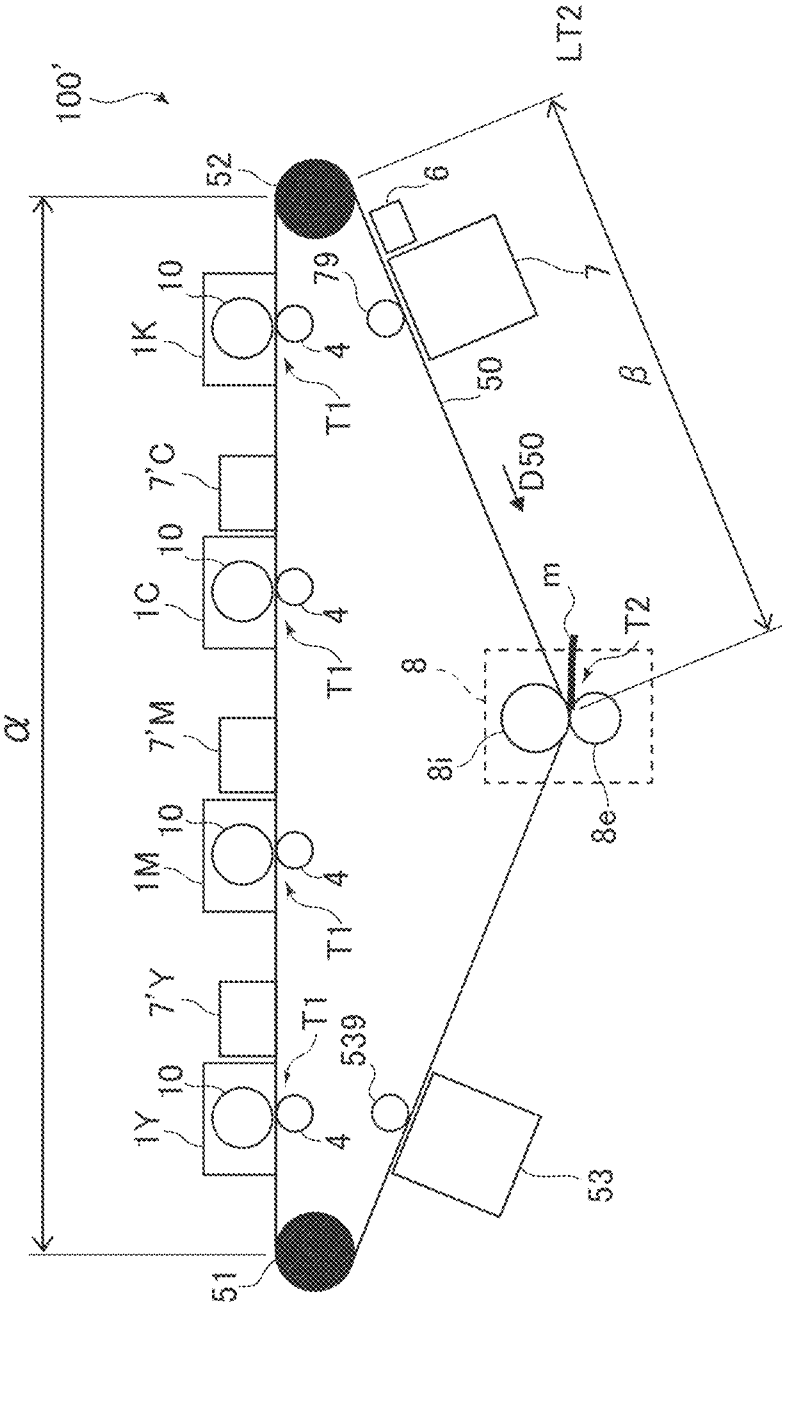
FIG. 12 is a schematic structural sectional view of an image forming apparatus according to a fifth embodiment.

A fifth embodiment will be described using FIG. 12. FIG. 12 is a sectional view showing a schematic structure of an image forming apparatus 100' of this embodiment. In this embodiment, in addition to the constitution of this embodiment, carrier collecting devices 7'Y, 7'M, and 7'C are provided. Other constitutions and actions are the same as those in the above-described embodiment 1.

The image forming apparatus 100' of this embodiment includes, as shown in FIG. 12, four image forming units 1Y, 1M, 1C, and 1K, the intermediary transfer member 50, the belt cleaning device 53, the carrier discharging device 6, the carrier collecting device 7, and the like. Incidentally, in this embodiment, similarly as in the embodiment 1, the collecting sleeve 701 of the carrier collecting device 7 is provided with the power source 74, but as in the embodiment 2, the power source 74 may be omitted.

Further, the image forming apparatus 100' of this embodiment is different from the image forming apparatus 100 of the first embodiment, and includes carrier collecting devices 7'Y, 7'M, and 7'C on a side immediately downstream of the image forming units 1Y, 1M, and 1C, respectively, with respect to the rotational direction of the intermediary transfer member 50.

In other words, the carrier collecting device 7'Y is disposed downstream of the image forming unit 1Y and upstream of the image forming unit 1M with respect to the rotational direction of the intermediary transfer member 50. Further, the carrier collecting device 7'M is disposed downstream of the image forming unit 1M and upstream of the image forming unit 1C with respect to the rotational direction of the intermediary transfer member 50. Further, the carrier collecting device 7'C is disposed downstream of the image forming unit 1C and upstream of the image forming unit 1K with respect to the rotational direction of the intermediary transfer member 50.

Incidentally, the carrier collecting devices 7'Y, 7'M, and 7'C are different in shape from the carrier collecting device 7, but are formed of all the same materials inclusive of constituent component parts. That is, each of the carrier collecting devices 7'Y, 7'M, and 7'C includes, similarly as the carrier collecting device 7 shown in FIG. 4, a carrier collecting roller, a carrier collecting blade, a carrier conveying screw, a carrier collecting container, and the like. Further, the carrier collecting roller includes a rotatable collecting sleeve, a magnet roller as a magnetic field generating portion, and the like. Further, functions and materials of these constituent elements are similar to those of the constituent elements of the carrier collecting device 7 shown in FIG. 4, but, for example, sizes and the like of these constituent elements are different from those of the constituent elements of the carrier collecting device 7 shown in FIG. 4. For example, the sizes of the carrier collecting devices 7'Y, 7'M, and 7'C are made smaller than the size of the carrier collecting device 7 shown in FIG. 4. To the collecting sleeve of each of the carrier collecting devices 7'Y, 7'M, and 7'C, similarly as the carrier collecting device 7 shown in FIG. 4, a voltage of the same polarity as the charge polarity of the non-magnetic toner may be applied from the power source as a voltage applying portion. This power source may be provided for each of the carrier collecting devices 7'Y, 7'M, and 7'C, but may also be made common to the carrier collecting devices 7'Y, 7'M, and 7'C. The power source may also be made common to the carrier collecting devices 7'Y, 7'M, and 7'C, and the carrier collecting device 7 shown in FIG. 4. Incidentally, a constitution, in which the power source for applying the voltage to the collecting sleeve of each of the carrier collecting devices 7'Y, 7'M, and 7'C is not provided similarly as in the constitution described with reference to FIG. 9 may be employed.

In such a case of this embodiment, as shown in the embodiment 5 of the above-described table 1, compared with the embodiment 1, the image defect occurrence rate due to carrier deposition becomes low. This is because in the embodiment 5, the carrier collecting devices 7'Y, 7'M, and 7'K collect the carrier on the sides immediately downstream of the image forming units 1Y, 1M, and 1C, respectively, and therefore, the influence on image formation by the carrier deposition in the image forming unit immediately downstream of its upstream image forming unit can be reduced. On the other hand, in the embodiment 1, the number of the carrier collecting devices is 1, but in the embodiment 5, the number of the carrier collecting devices is made 4, and correspondingly, the device cost is increased.

Other Embodiments

In the above-described embodiments, as the carrier collecting device, the mechanism for collecting the carrier by the magnetic force was described. However, the carrier collecting device is not limited to such a constitution, and, for example, a constitution in which the carrier is collected by applying a voltage of an opposite polarity to the charge polarity of the carrier may also be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-127863 filed on Aug. 4, 2023, and No. 2024-078954 filed on May 14, 2024, which are hereby incorporated by reference herein in their entirety.

What is claimed is:

1. An image forming apparatus comprising:

a rotatable image bearing member on which an electrostatic latent image is formed;

a developing device including a developing container configured to accommodate a developer containing non-magnetic toner and a magnetic carrier, and a developer carrying member configured to carry the developer for developing the electrostatic latent image, formed on the image bearing member, into a toner image;

a rotatable intermediary transfer member onto which the toner image borne on the image bearing member is transferred;

a carrier collecting device including a rotatable sleeve provided opposed to the intermediary transfer member and a magnet non-rotationally provided inside the sleeve and configured to collect the carrier on the intermediary transfer member, and a voltage applying portion configured to apply a voltage of the same polarity as a charge polarity of the non-magnetic toner to the sleeve, wherein with respect to a rotational direction of the intermediary transfer member, the collecting device is disposed downstream of a first transfer position where the toner image borne on the image bearing member is transferred onto the intermediary transfer member and upstream of a second transfer position where the toner image borne on the intermediary transfer member is transferred onto a recording material.

2. An image forming apparatus according to claim 1, wherein a lowermost end of the carrier collecting device is positioned above the secondary transfer position.

3. An image forming apparatus according to claim 1, further comprising:

a rotatable steering roller configured to control a position of the intermediary transfer member with respect to a direction perpendicular to a movement direction of the intermediary transfer member; and a supporting member configured to support an end portion of a rotation shaft of the steering roller, wherein the carrier collecting device is connected to the supporting member so as maintain a relative position to the intermediary transfer member.

4. An image forming apparatus according to claim 1, further comprising:

a rotatable second image bearing member on which an electrostatic latent image is formed;

a second developing device including a second developing container configured to accommodate a second developer containing non-magnetic toner and a magnetic carrier, and a second developer carrying member configured to carry the second developer for developing the electrostatic latent image, formed on the second image bearing member, into a toner image; and a second carrier collecting device including a rotatable second sleeve provided opposed to the intermediary transfer member and a second magnet non-rotationally provided inside the second sleeve and configured to collect the carrier on the intermediary transfer member, wherein the toner image borne on the second image bearing member is transferred onto the intermediary transfer member, and wherein with respect to the rotational direction of the intermediary transfer member, the second carrier collecting device is disposed downstream of a third transfer position where the toner image borne on the second image bearing member is transferred onto the intermediary transfer member and upstream of the first transfer position.

5. An image forming apparatus comprising:

a rotatable image bearing member on which an electrostatic latent image is formed;

a developing device including a developing container configured to accommodate a developer containing non-magnetic toner and a magnetic carrier, and a developer carrying member configured to carry the developer for developing the electrostatic latent image, formed on the image bearing member, into a toner image;

a rotatable intermediary transfer member onto which the toner image borne on the image bearing member is transferred; and a carrier collecting device including a rotatable sleeve provided opposed to the intermediary transfer member and a magnet non-rotationally provided inside the sleeve and configured to collect the carrier on the intermediary transfer member, wherein with respect to a rotational direction of the intermediary transfer member, the collecting device is disposed downstream of a first transfer position where the toner image borne on the image bearing member is transferred onto the intermediary transfer member and upstream of a second transfer position where the toner image borne on the intermediary transfer member is transferred onto a recording material, and wherein a lowermost end of the carrier collecting device is positioned above the secondary transfer position.

6. An image forming apparatus according to claim 5, further comprising:

a voltage applying portion configured to apply a voltage of the same polarity as a charge polarity of the non-magnetic toner to the sleeve.

7. An image forming apparatus according to claim 5, further comprising:

a rotatable steering roller configured to control a position of the intermediary transfer member with respect to a direction perpendicular to a movement direction of the intermediary transfer member; and a supporting member configured to support an end portion of a rotation shaft of the steering roller, wherein the carrier collecting device is connected to the supporting member so as maintain a relative position to the intermediary transfer member.

8. An image forming apparatus according to claim 5, further comprising:

a rotatable second image bearing member on which an electrostatic latent image is formed;

a second developing device including a second developing container configured to accommodate a second developer containing non-magnetic toner and a magnetic carrier, and a second developer carrying member configured to carry the second developer for developing the electrostatic latent image, formed on the second image bearing member, into a toner image; and a second carrier collecting device including a rotatable second sleeve provided opposed to the intermediary transfer member and a second magnet non-rotationally provided inside the second sleeve and configured to collect the carrier on the intermediary transfer member, wherein the toner image borne on the second image bearing member is transferred onto the intermediary transfer member, and wherein with respect to the rotational direction of the intermediary transfer member, the second carrier collecting device is disposed downstream of a third transfer position where the toner image borne on the second image bearing member is transferred onto the intermediary transfer member and upstream of the first transfer position.

* * * * *